Nov. 4, 1969  S. C. REES  3,476,960
DOUBLE INSULATED POWER TOOLS
Filed July 1, 1968
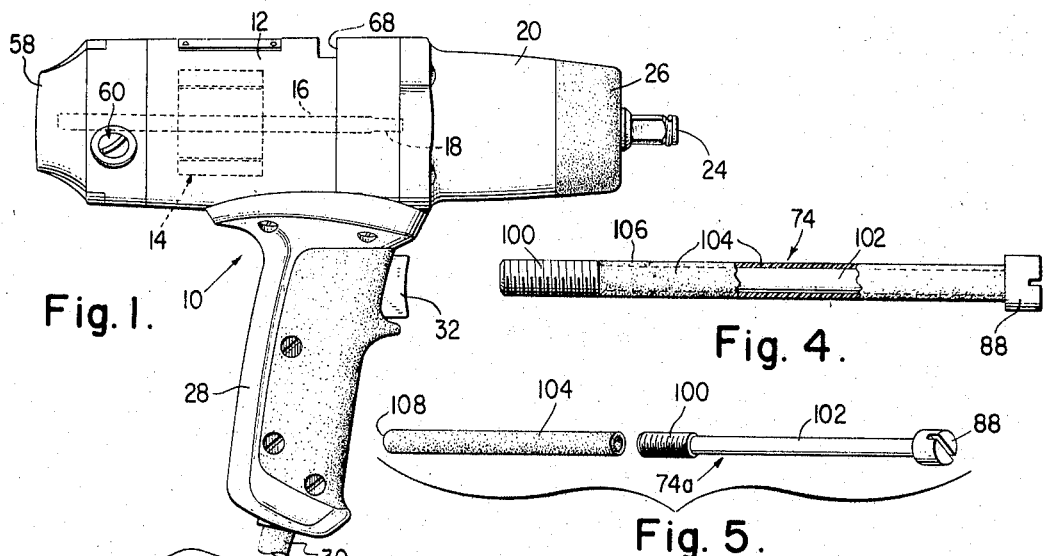
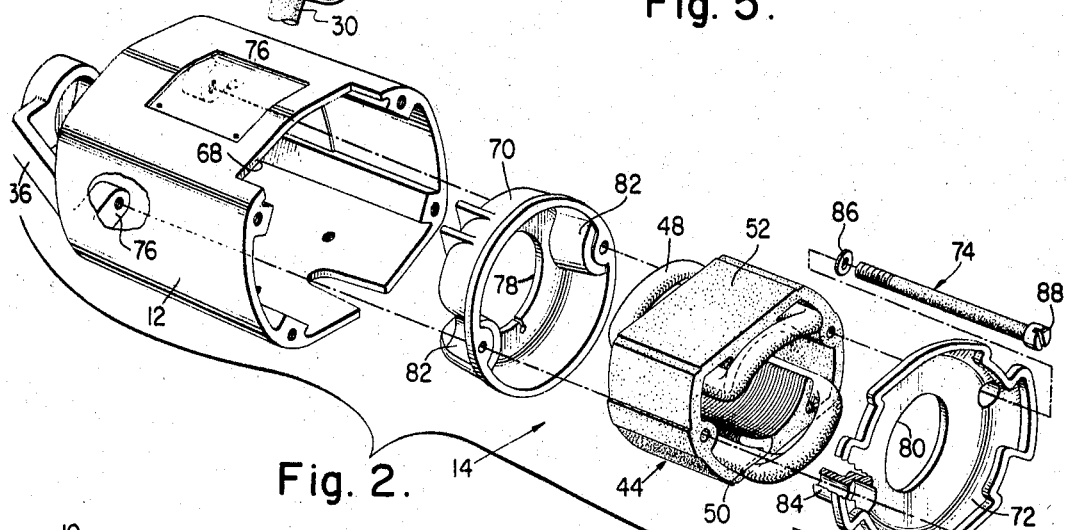
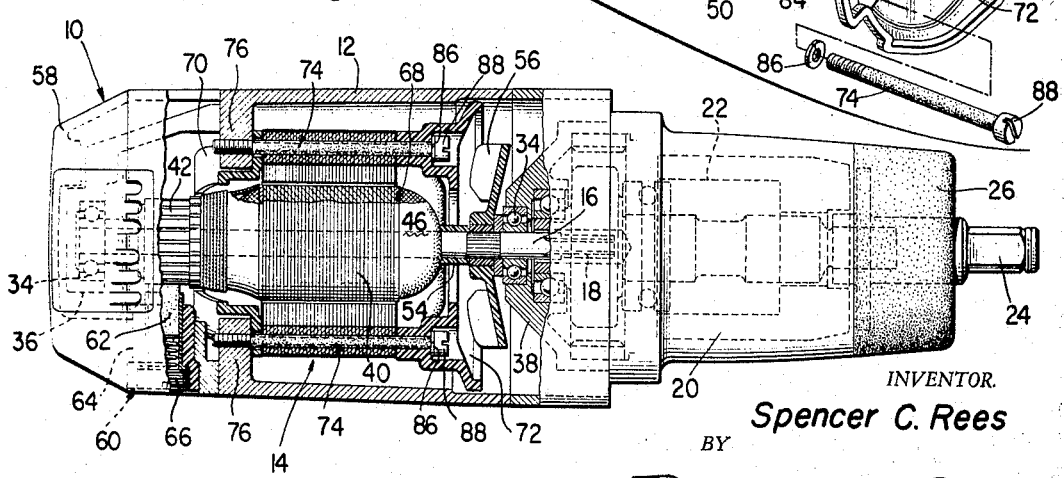
INVENTOR.
Spencer C. Rees
BY
Marshall J. Breen
ATTORNEY

United States Patent Office 3,476,960
Patented Nov. 4, 1969

3,476,960
DOUBLE INSULATED POWER TOOLS
Spencer C. Rees, Aurora, Ill., assignor to The Singer Company, New York, N.Y., a corporation of New Jersey
Filed July 1, 1968, Ser. No. 741,633
Int. Cl. H02k 7/14, 5/00, 1/06
U.S. Cl. 310—50   4 Claims

ABSTRACT OF THE DISCLOSURE

Double insulated power tools in which the motor thereof has a metallic housing in which the functionally insulated motor components are operationally mounted therein and provided with protecting insulation which provides a second barrier. An integrally insulated field is clamped to the housing between a pair of insulating shrouds by metal screws which in turn have insulated shanks which form a dielectric barrier along the portion of the screws passing through the field and shrouds. This assembly is used in combination with the motor having an insulating tube between the shaft and the armature core, and an insulated end cover supporting insulated brush holders to form a power tool which does not require a ground connection to prevent electrical shock to the operator.

BACKGROUND OF THE INVENTION

Heretofore a three-prong grounded plug was used as one approach to protect the operator of an electrically driven power tool or appliance. Another approach to the problem of accidental electric shock has been to provide portable electric power tools, or appliances with an additional dielectric barrier, or the power tool or appliance is more commonly referred to as being "double insulated." This has been done, for example, by using a housing of dielectric material, such as plastic, to completely enclose the "live" parts of the motor. Alternately, plastic liners or bushings have been used to isolate the "live" parts of the motor from those which the operator normally comes in contact with. However, the use of plastic for the housing or for the assembled dielectric barrier cause problems related to ease of assembly, cost, structural strength, dimensional stability, heat dissipation, flammability, and the like.

SUMMARY OF THE INVENTION

In accordance with the present invention an improved double insulated power tool is driven by an electric motor having an armature winding, a field winding and a commutator connected to an electric potential and special means are provided to protect against transmitting the electric potential to exposed parts of said tool. The tool includes the combination of a metal housing, an insulated tube affixed to a rotatably journaled shaft in the housing which carries the armature and commutator. The field core is insulated, and is enclosed by a field shroud at one end and a fan shroud at the other end. Metal connector means having a dielectric barrier formed thereon directly connect to the housing to clamp the field shroud, field core and fan shroud thereto in such a manner that if the field core should become connected to the electric potential through a failure of the functional insulation, said potential could not be transmitted to the housing.

In the present application the term "double insulated" power tool or appliance means that in addition to the basic functional insulation necessary for the proper functioning of the tool or appliance there is provided a secondary system of insulation designated generally as protecting insulation. The protecting insulation denotes an independent insulation, provided in addition to the functional insulation, to insure against electric shock to the operator of the power tool in case of failure of the functional insulation. In the protecting insulation an enclosure of insulating material may form a part or the whole of the protecting insulation. In other words, the term "double insulation" denotes an insulation system comprised of functional insulation and protecting insulation, with the two insulations physically separated and so arranged that they are not simultaneously subjected to the same deteriorating influences to the same degree.

It is therefore, an object of the present invention to provide an improved double insulated power tool or appliance which overcomes the prior art deficiencies; which is simple, economical, and reliable; which eliminates the need for a grounded three-prong plug or adapter; which provides both functional insulation and protecting insulation; which uses protecting insulation in assembling the motor components to the metal housing; which is used in a tool having a metal housing and shaft; which uses a pair of insulated shrouds clamped to either end of an integrally insulated field core to separate the same from the housing, with the clamping means including a metal connector having a dielectric barrier formed thereon to prevent the passage of electric potential therethrough; which uses a metal connector to clamp the insulated shrouds and field core, which connector has an insulated sleeve formed thereon; which uses a metal connector having an insulated sleeve formed of epoxy resin; and which uses a metal connector having an insulated sleeve formed of heat shrinkable plastic tubing.

Other objects and advantages will be apparent from the following description of the invention and the novel features will be particularly pointed out hereinafter in the claims.

BRIEF DESCRIPTION OF THE DRAWINGS

This invention is illustrated in the accompanying drawings in which:

FIG. 1 is a side elevational view of a typical power tool, such as an impact wrench, embodying the present invention.

FIG. 2 is an exploded perspective view, partly in section, of the motor housing and protecting insulation of FIG. 1.

FIG. 3 is an enlarged side elevational view, partly in section of the power tool of FIG. 1.

FIG. 4 is a side elevational view, partly in section, of one form of an improved metal connector means, including the dielectric barrier formed thereon, of the present invention.

FIG. 5 is an exploded perspective view of another form of improved metal connector showing the insulated sleeve disassembled therefrom.

DESCRIPTION OF THE INVENTION

A conventional power tool, as for example, an impact wrench is shown in FIGS. 1 and 3 embodying the present invention. The impact wrench is but one typical example of a double insulated power tool or appliance to which the present invention is applicable.

The impact wrench illustrated in FIGS. 1 and 3 has a housing 10 which includes a metal motor housing 12 for mounting a motor 14 having an armature shaft 16, the free end of which has an integrally formed pinion 18 extending into a metal forward housing 20 to drivingly engage a conventional drive and impact mechanism 22 housed therein and shown in phantom in FIG. 3. An anvil 24 is carried by the forward end of mechanism 22 and extends outwardly of the forward end of the housing 20 passed the plastic nose piece 26 thereof.

A plastic pistol grip handle 28 is connected to the underside of the motor housing 12 and has a cord 30 adapted to be connected to an electric potential disposed therein to be suitably connected in circuit with a switch 32 and the motor 14, which motor will be operated upon actuation of the switch 32 in the usual manner.

The shaft 16 is journaled in spaced ball bearings 34 carried in a bearing bracket 36 of the motor housing 12 and a bearing bracket 38 of the forward housing 20, respectively.

The motor housing 12, the forward housing 20, and the armature shaft 16 are all made of suitable metal which provides for an impact wrench with the proper structural strength and dimensional stability, in addition to the other desirable characteristics most economically provided by metal. However, in order to properly protect the operator of the tool from the hazard of accidental electric shock or contact with the electric potential a protecting insulation is provided as set forth hereinafter.

In order for the motor 14 to supply power to drive the mechanism 22 of the impact wrench, a functional insulation is provided in the usual manner. Briefly, the functional insulation is used on the wire making up the armature winding and the field winding, the armature slot insulation and the insulation for the cord 30. In the absence of the functional insulation it would be impossible to properly operate the motor 14, and therefore the use of functional insulation has been and will continue to be required.

The electric motor 14 has an armature 40 and a commutator 42 carried on the armature shaft 16, with the field 44 disposed in superposition about the armature 40 in the usual manner.

Stacked steel laminations make up the core of the armature 40 and the field 44, about which is disposed an armature winding 46 and a field winding 48, as shown in FIGS. 2 and 3, respectively. The field 44 is provided with a complete surface coating of an insulation, such as epoxy resin, except for the gap face of the field poles 50, before the field windings 48 are placed thereon. Thus, the field 44 has an integrally insulated field core, designated generally as 52.

An insulating tube 54 is affixed to the armature shaft 16 to insulate said shaft from the core of the armature 50. A fan 56 is connected to the shaft 16 adjacent the forward end of the insulating tube 54. A plastic end cover 58, illustrated in FIGS. 1 and 3, encloses the open rearward end of the motor housing 12. The end cover 58 carries a pair of brush assemblies 60 mounted therein in diametrically spaced alignment to each other whereby spring biased brushes 62 will be urged to engage opposite sides of the outer periphery of the commutator 42. The brush assemblies 60 are insulated by means of an insulating tube 64 closed by an insulating cap 66 threadedly engaged at the outer end thereof. The end cover 58 has inlet apertures (not shown) through which on operation of the motor 14 cooling air will be induced by the fan 56 through the motor housing 12 for discharge through the outlet aperture 68 at the forward end of the motor housing 12.

The exposed part of the switch 32 which the operator contacts is made of a plastic to serve, along with the plastic handle 28, as a part of the protecting insulation.

Double insulation, as discussed hereinbefore requires that there be no exposed metal directly contacting the functional insulation. Therefore, the exposed metal must be separated from the functional insulation either by an air gap of sufficient dimensions to prevent arcing or by a protecting insulation.

Therefore, in addition to the insulated handle 28, the insulating tube 54, the insulated end cover 58, the insulated brush assembly 60, and the integrally insulated field core 52, the protecting insulation also includes insulated end discs 68, shown in FIG. 3, disposed on either end of the core of the armature 40; and a pair of preformed insulated shrouds 70 and 72 between which the field 44 is held in a nested position by insulated metal screws or connectors 74 which serve to clamp said shrouds and field to the metal motor housing 12 by threadedly engaging tapped holes in bosses 76 formed therein. The shroud 70 may be designated as a field shroud, while the shroud 72 may be designated as a fan shroud. Both of the shrouds 70 and 72 are cupped shaped with central apertures 78 and 80, respectively, formed at the otherwise closed end of the cap which faces rearwardly. The bosses 76 seat within enclosed recesses 82 formed diametrically opposite each other to permit the face of the field shroud to abut the rearward or left edge of the field core while the bottom of the field shroud 70 extends past the bosses 76. The fan shroud 72 has countersunk apertures or spacer sleeves 84 which extend leftwardly or rearwardly of the bottom of the shroud to abut the forward or rightward edge of the field core 52.

The shroud and field assembly is best seen in FIG. 2, which shows the field shroud 70, the field 44 and the fan shroud 72 adapted to be passed into the motor housing 12 with the respective holes therein in alignment with the tapped hole in the boss 76. To complete the assembly of the shrouds and field, the insulated metal screws 74 are disposed through the aligned holes to threadedly engage the tapped holes of the bosses 76, with a lock washer 86 disposed adjacent the head 88 of the screw 74.

A threaded portion 100 is formed at the end of the screw 74 remote from the head 88, and an elongated shank 102 of smaller uniform diameter than the diameter of the threaded portion 100 extends therefrom to the head 88, as illustrated in FIGS. 4 and 5. The length of the shank 102 corresponds to the combined lengths of the sleeve 84 and the field core 52 and the abutment wall of the recess 82. Without a dielectric barrier it would be possible upon a breakdown of the functional insulation for electric potential to be transmitted from the field 44 to the screw 74 to the boss 76 and subsequently the metal housing 12. In order to prevent this the metal screw 74 is made a part of the protecting insulation through the device of an insulating sleeve 104 being placed about the shank 102.

Of the many forms of insulating sleeves that may be applied to the metal screw 74 only two need be referred to herein, namely, that of an epoxy resin coating shown in FIG. 4, and that of a heat shrinkable plastic tubing shown in FIG. 5.

The FIG. 4 embodiment of the insulated metal screw 74 shows the epoxy resin coating 106 after its application by a spray, a mist or a powder as a suspension coating, a vibratory bed coating, or a fluidized bed coating of suitable thickness to form a dielectric barrier to prevent electric potential from being transmitted through the shank 102 to the threaded portion 100.

FIG. 5 shows an alternate approach to forming a dielectric barrier at the shank 102 by means of a heat shrinkable plastic tubing 108 being used to form the insulated sleeve 104, in which case the tubing will be disposed about the shank 102 of the metal screw, designated generally as 74a, prior to the application of heat so as to shrink it to seat upon the shank 102 so as to prevent its accidental removal from the metal screw 74a. If the tubing is made of a modified polytetrafluorethylene it will be shrunk to seat upon the shank 102 by the application of heat in excess of 621° F.

The insulated metal screw shown in FIGS. 2 and 3, will be understood to be either of the insulated metal screws 74 or 74a since either could be used with equal effectiveness in forming a dielectric barrier, or for that matter other metal connectors may be substituted therefor provided that they too include suitable dielectric barriers in the area of the shrouds and fields.

In summary, the protecting insulation provides that any exposed metal such as the metal motor housing 12 and the bosses 76 thereof has been electrically isolated by the protecting insulation as set forth hereinabove, or the exposed metal is so located as to create a sufficient air gap from the motor components which might otherwise become "live" so as to provide against arcing.

It will be understood that various changes in the details, materials, arrangements of parts, and operating conditions which have been herein described and illustrated in order to explain the nature of the invention may be made by those skilled in the art within the principles and scope of the invention as expressed in the claims.

Having thus set forth the nature of the invention, what I claim herein is:

1. A double insulated power tool driven by an electric motor having an armature winding, field winding and commutator connected to an electric potential and protected against transmitting the electric potential to exposed parts of said tool comprising:
   (a) a metal housing,
   (b) a metal shaft carrying the armature and the commutator rotatably journaled in the housing,
   (c) insulating tube means affixed to at least a portion of the shaft,
   (d) means insulating the walls of the field core,
   (e) an insulated annular field shroud enclosing the end of the field adjacent the commutator, and said shroud having an aperture through which the shaft and commutator extends,
   (f) a fan mounted on the shaft remote from the commutator,
   (g) an insulated annular fan shroud disposed between the fan and the field, and said shroud having an aperture through which the shaft extends, and
   (h) metal connector means clamping the field shroud, the field core and the fan shroud to the housing,
   (i) said metal connector means having a dielectric barrier formed thereon to prevent the passage of electric potential therethrough.

2. The combination claimed in claim 1 wherein:
   (a) the metal connector means defines a screw connected directly to the housing,
   (b) an insulated sleeve disposed upon said screw to form the dielectric barrier for the portion thereof adjacent the field shroud, field core and fan shroud.

3. The combination claimed in claim 2 wherein:
   (a) the insulated sleeve is formed by suspension coating of an epoxy resin.

4. The combination claimed in claim 2 wherein:
   (a) the insulated sleeve is formed of heat shrinkable plastic tubing.

References Cited

UNITED STATES PATENTS

| | | | |
|---|---|---|---|
| 3,119,942 | 1/1964 | Luther | 310—50 |
| 3,121,813 | 2/1964 | Pratt et al. | 310—50 |
| 3,225,230 | 12/1965 | Maffey | 310—50 |
| 3,344,291 | 9/1967 | Pratt | 310—50 |
| 3,413,498 | 11/1968 | Bowen et al. | 310—47 |

WARREN E. RAY, Primary Examiner

U.S. Cl. X.R.

310—89, 217, 259